(12) United States Patent
Ismail (10) Patent No.: US 10,112,730 B2
(45) Date of Patent: Oct. 30, 2018

(54) SYSTEM AND METHODS FOR REMOTE MONITORING DRONES AND AERIAL VEHICLES FOR SECURITY AND HEALTH MONITORING PURPOSES

(71) Applicant: Mohamed Alsayed Ahmed Mohamed Ismail, Braunschweig (DE)

(72) Inventor: Mohamed Alsayed Ahmed Mohamed Ismail, Braunschweig (DE)

(*) Notice: Subject to any disclaimer, the term of this patent is extended or adjusted under 35 U.S.C. 154(b) by 0 days.

(21) Appl. No.: 15/918,416

(22) Filed: Mar. 12, 2018

(65) Prior Publication Data

US 2018/0273208 A1 Sep. 27, 2018

(30) Foreign Application Priority Data

Mar. 21, 2017 (DE) .......... 10 2017 002 696
Apr. 24, 2017 (DE) .......... 10 2017 108 733
Oct. 30, 2017 (DE) .......... 10 2017 010 172

(51) Int. Cl.
| | | |
|---|---|---|
| G08B 21/00 | (2006.01) | |
| B64F 5/60 | (2017.01) | |
| G07C 5/00 | (2006.01) | |
| G06N 3/02 | (2006.01) | |
| B64D 45/00 | (2006.01) | |

(52) U.S. Cl.
CPC ............ B64F 5/60 (2017.01); G07C 5/006 (2013.01); B64D 2045/0085 (2013.01); G06N 3/02 (2013.01)

(58) Field of Classification Search
CPC ..................... G01S 1/00; B60T 1/00
See application file for complete search history.

(56) References Cited

U.S. PATENT DOCUMENTS

| | | | |
|---|---|---|---|
| 6,192,759 B1 | 2/2001 | Schoess | |
| 6,693,548 B2 | 2/2004 | Boyce et al. | |
| 8,446,321 B2 | 5/2013 | Smith | |
| 9,275,645 B2 | 3/2016 | Hearing et al. | |
| 2009/0257314 A1* | 10/2009 | Davis | G01S 5/18 367/125 |
| 2017/0010148 A1* | 1/2017 | Germanetti | G01G 19/07 |

FOREIGN PATENT DOCUMENTS

| | | |
|---|---|---|
| DE | 3929077 C2 | 1/1997 |
| DE | 102007062603 A1 | 2/2009 |

OTHER PUBLICATIONS

German Office Action for German Application No. 102017108733.8 dated Nov. 7, 2017.

* cited by examiner

Primary Examiner — Shirley Lu
(74) Attorney, Agent, or Firm — The Dobrusin Law Firm, PC (57) ABSTRACT

One or more methods for remotely estimating a drone's weight during flying are contemplated. It is possible to utilize a long range laser Doppler Vibrometer or a remote optical surveillance system. In addition, it is possible to employ a method disclosed herein using physical signatures for identifying flight characteristics and manufacturers of different drones and for monitoring drones' degradation prior to failures as a condition based maintenance system. The present teachings are applicable to drones, helicopters, and all manned and unmanned aerial vehicles.

6 Claims, 6 Drawing Sheets

SYSTEM AND METHODS FOR REMOTE MONITORING DRONES AND AERIAL VEHICLES FOR SECURITY AND HEALTH MONITORING PURPOSES

FIELD

The present teachings relate to a system and methods for monitoring aerial vehicles, and more particularly to a system and method for remotely identifying the mass, the manufacturer's model, and the degradation level of an aerial vehicle during flying.

BACKGROUND

There is an increased demand to use Unmanned Aerial Vehicles (UAVs), or drones in general, for many civil applications, e.g., transportation, rescue, and surveillance. At the same time, the risk of illegal use of drones has been greatly raised in terms of privacy violation, spying, and terrorism. The current state of the art involves many drone detection and identification systems that are based on diverse sensing technologies and processing methods. Examples of these features are acoustic sensors; image and video surveillance; and radio frequency (RF) sensors.

With respect to acoustic sensors, drones generate relative loud acoustic noise from their propellers, motors, and engines. Suitable acoustic sensors are used to acquire and analyze drone noise in the time and frequency domains (e.g., frequency spectrum) in order to identify their unique acoustic signature from other noises generated from non-drone sources. These signatures can be evaluated directly and/or compared with pre-stored databases to recognize drone capabilities, manufacturers, and risks. Examples of this approach include U.S. Pat. No. 9,275,645 B2, DE 3929077 C2, and US 2009/0257314 A1. Acoustic sensors are sensitive to background noise that are unavoidable at loud important zones, such as airports and sport events. In addition, certain drone types have weak acoustic noise, in particular at long distances. Problems such as background noise and weak drone-noise extraction can lead to frequent and expensive false detection alarms.

With respect to image and video surveillance, most types of optical images, such as snapshot images, images from video/movies, and thermal images, are utilized to extract signatures for a drone's shape and all appearance aspects. These signatures can be evaluated directly and/or compared with pre-stored databases to recognize drone capabilities, manufacturers, and risks. An example of this approach may be found in U.S. Pat. No. 8,446,321 B2.

With respect to radio frequency (RF) sensors, one of the detection methods is based on detecting wireless RF signals between a drone and its remote control unit. These signals may be control signals and/or a video stream between a drone and a remote unit. By analyzing these signals, relevant signatures can be extracted. These signatures can be evaluated directly and/or compared with pre-stored databases to recognize drone capabilities, manufacturers, and risks. An example of this approach may be found in DE102007062603A1.

Currently available methods are unable to provide detailed information regarding a non-registered drone, like gross weight (including payload), or maintenance health status of a registered drone structure and its rotating parts. Safety regulations for drones in USA and Germany, for example, are based on their weight. The drone weight is an important security feature in order to prevent transporting hazardous materials, such as bombs or explosives, or to prevent spying. Currently, there are no tools or methods to remote monitor in-flight payload of drones to check pre-registered limits. The design payload of standard commercial drones can be greatly increased by simple design modifications, e.g., by changing the propeller's size and/or driving motors. Such modifications may significantly increase payload capacity to carry dangerous materials without triggering aforementioned drone detection systems. In addition, the maintenance health status information, such as components' wear and degradation, faults, or component failures, are also important to predict and avoid vehicle failure and related accidents.

SUMMARY

One object of the invention is to provide methods for remote identifying aerial vehicles by monitoring their flying performance, rather than directly monitoring their acoustic or optical signatures, in order to mitigate the mentioned shortcomings. The scope of this invention includes remote identification of aerial vehicles that have been detected by a separate detection system such as a radar, an acoustic detection system, or an optical surveillance system.

This object is achieved by methods involving possible combinations of sensors and signal processing techniques to assess the motion performance of an aerial vehicle or a drone. A method for estimating the mass of an aerial vehicle may comprise the steps of: receiving the instantaneous location of said vehicle with respect to a reference point in the three spatial coordinates x, y, z, from a radar or a camera based surveillance system; receiving the instantaneous rotating speed of one or more rotating parts, e.g., propellers, of the propulsion system of the vehicle using a signal from a camera speed-recognition system directed to the vehicle; and solving a dynamic equation of motion model using the recorded measurements of the instantaneous location and the instantaneous rotating speed in order to approximately estimate the parameters of the dynamic equation of motion model. These parameters may involve the vehicle mass and a speed-thrust characteristic curve of the vehicle.

The instantaneous location of the vehicle may be used to estimate the instantaneous speed and acceleration quantities that are related to the consumed kinetic energy of the vehicle. The instantaneous rotating speed may be related to the generated energy from the propulsion system of the vehicle. These consumed and generated energies are balanced in a dynamic equation of motion model in order to estimate approximated values for the vehicle mass and performance signatures or parameters for the vehicle propulsion system.

A method for remote identifying drones may involve an extended version of the preceding motion model by involving propeller characteristics, such as a propeller's size and/or a propeller's shape, in order to enhance the estimation accuracy of the model. The propeller's size and shape can be remotely measured by a camera based recognition described herein.

The vehicle mass and the speed-thrust characteristic curve can be compared to a pre-stored database of different vehicle manufacturers' models to identify the vehicle model. Furthermore, the vehicle model and the speed-thrust characteristic curve can be compared to a pre-stored database of deteriorated levels of a pre-identified vehicle to determine the current degradation level, e.g., faults and failures, for the vehicle or its subcomponents.

The term "aerial vehicle", as understood by the invention, encompasses each and any object, manned or unmanned, capable of travelling through the air free of ground contact, on a controlled trajectory. This includes, but is not limited to, drones, unmanned aerial vehicles (UAVs), fixed wing aircrafts, rotary wing aircrafts and helicopters.

The one or more rotating parts of said vehicle may include rotor blades, propeller blades, turbine blades, jet/gas compressors, reciprocating engine, or similar parts.

Receiving the instantaneous rotating speed of said one or more rotating parts may comprise: a remote measuring of vibration of said vehicle using a laser Doppler vibrometer (LDV); and applying, via a processor, signal processing techniques to extract the instantaneous rotating speed. The signal processing of said vibration may further comprise: applying time waveform and/or frequency spectrum comparison to extract said rotating speed of said one or more rotating parts of said vehicle.

Said waveform and/or frequency spectrum comparison may involve application of known signal processing methods, like frequency spectrum comparison, cyclostationary correlation, blade pass frequency, and/or instantaneous energy analysis.

The vibration of said vehicle measured by said laser Doppler vibrometer (LDV) may be further recorded, via digital or analog methods, and processed to monitor degradations, faults and failures of said vehicle components.

The vibration of said vehicle measured by said laser Doppler vibrometer (LDV) may further be recorded, via digital or analog methods, and processed to classify signatures of said vehicle. These signatures may be stored to compare different manufacturers and flight characteristics of said vehicle. Said recording and processing of vibrations, from LDV, may be employed in combination with, or independently from, the methods of estimating the vehicle mass as described above.

Receiving the instantaneous rotating speed of said one or more rotating parts from a camera based speed-recognition system may comprise: receiving successive images with time stamps from a camera directed to the vehicle; storing a pre-determined duration of the successive images in a digital memory; recognizing the rotation angles of at least one propeller of the vehicle on the successive images by an optical flow or a background subtraction image processing techniques; and processing the time variation of the rotation angles into the instantaneous rotating speed of at least one propeller using a numerical differentiator.

BRIEF DESCRIPTION OF THE DRAWINGS

Some possible embodiments of the invention will be described below with reference to the attached figures.

DETAILED DESCRIPTION

The remote identification methods are applicable to all manned and unmanned aircrafts and drones, such as fixed wings, rotor wings, helicopters, and electrical or non-electrical engine aircrafts. For each aircraft category, a specific dynamic equation of motion mode is required. Here, an example is explained for a quad-copter drone.

Figure 1:
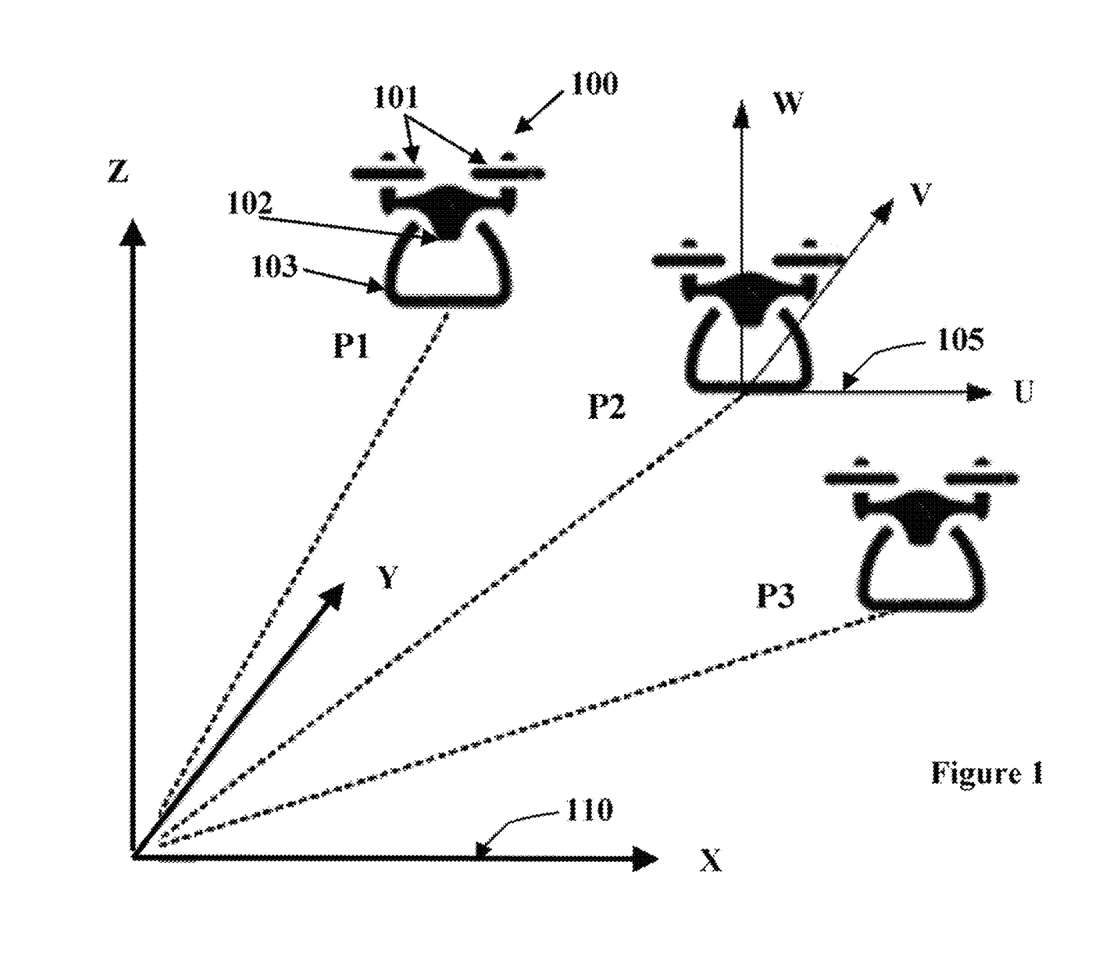
FIG. 1 is a schematic drawing of a moving frame of a vehicle in a fixed reference frame in accordance with the present teachings.

In FIG. 1, an aerial vehicle 100 flies through three different positions P1=(t1, x1, y1, z1), P2=(t2, x2, y2, z2), and P3=(t3, x3, y3, z3). In the shown example, the vehicle 100 has a propulsion system 101 including propellers, a main body portion 102, and a payload 103.

The vehicle 100 has an internal coordinate frame 105 with axes U, V, W. An external reference frame 110 has axes X, Y, Z, wherein the Z-axis is preferably antiparallel to the direction of gravity.

Figure 5:
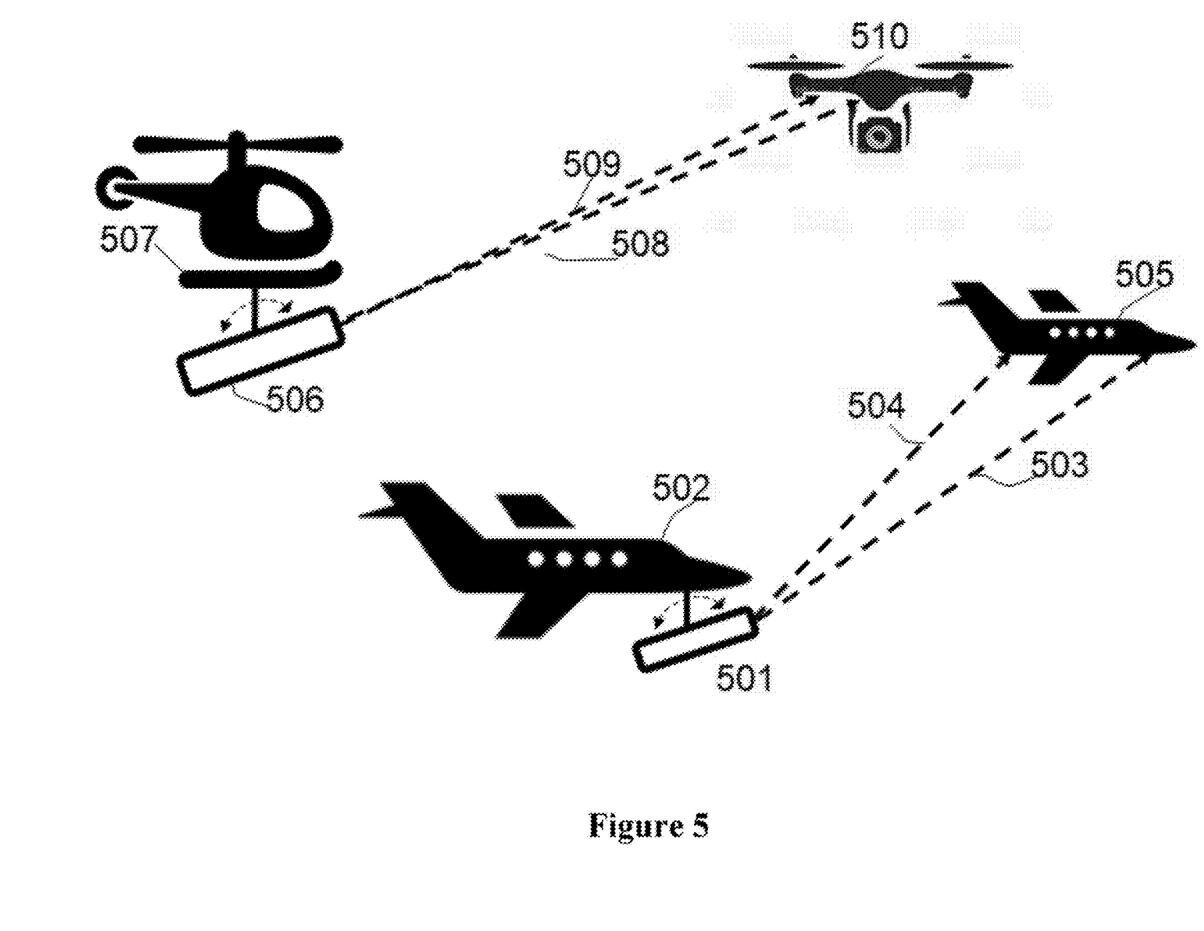
FIG. 5 is a schematic drawing of a method to remote measure vibration of an aerial vehicle by using a laser Doppler vibrometer attached to another aerial vehicle in accordance with the present teachings.

A dynamic equation of motion model (EOM) of vehicle 100 with respect to frame 110 may be approximated by the following dynamic model in Eq. (1):

$$m\ddot{X} = m \begin{bmatrix} \ddot{x} \\ \ddot{y} \\ \ddot{z} \end{bmatrix} = \begin{bmatrix} 0 \\ 0 \\ -mg \end{bmatrix} + TR + F_r \quad (1)$$

where P(n)=(t, x, y, z) is the position vector of the vehicle 100 in the reference frame 110, n is sample number of position measurements, m is the drone weight in kg, g is the gravitational constant 9.81 ms$^{-2}$, $\ddot{X}$ is the acceleration vector which is numerically estimated from successive measurements of the position vector P, and T is the thrust vector generated by propulsion system 101 in N. R is a 3×3 rotation matrix which coordinates the drone moving frame 105 with respect to reference frame 110. The reference frame 110 may be fixed on the ground or in a mounted in aground or aerial vehicle as shown in FIG. 5. The thrust T can be related to the propeller/the rotor's rotational speed ω rad/s by assuming a polynomial formula, for example in Eq. (2):

$$T = K\omega^2 \quad (2)$$

where K characterizes the speed-thrust relation of the propulsion system of the vehicle. The K value may be an unknown constant or an unknown speed-dependent characterization polynomial depending on the required accuracy of the EOM. $F_r$ is the total friction and drag forces vector in N. The $F_r$ may be neglected or calculated as a polynomial which is a function of drone's speed vector, $\dot{X}=[\dot{x}, \dot{y}, \dot{z}]^T$, for example in Eq. (3):

$$F_r = a\dot{X}^2, \dot{X}=[\dot{x},\dot{y},\dot{z}] \quad (3)$$

where α is a speed-drag constant or a speed-drag polynomial depending on the required accuracy of the EOM. Environmental conditions such as wind speed and direction significantly influence α. A polynomial which includes measurements of environmental data can be represented in α.

One objective of this method is to estimate the EOM parameters including: vehicle mass m, the speed-thrust constant K, and the speed-drag constant α of the vehicle 100 by solving an EOM such as in Eqs. (1-3) using numerous recorded measurements for the instantaneous position, vector P(n) and the instantaneous rotation speed of at least one of the propellers, ω. The least squares method or Bayesian techniques may be used to numerically estimate EOM parameters by measurements of P(n) and ω.

With respect to the instantaneous position, P, there are many possible drone detection methods to estimate P, such as typical RF radar, laser radar, sound localization, or camera positioning systems. A set of n positioning points or samples, i.e., (P(1), P (2) . . . P (n)), are required with their time stamps in order to estimate the instantaneous speed $\dot{X}$ and acceleration vectors $\ddot{X}$ in Eq. (1,3) using numerical differentiators and/or Kalman filters.

With respect to remote measuring of the instantaneous rotational speed, ω, of the propellers, there are possible methods that include: a vibration based speed-recognition system, a camera based speed-recognition system, and a signal from a remote optical tachometer device directed to the drone.

A method of the remote identifying a drone weight and its health performance using a simplified EOM, such as Eqs. (1-3), in addition to a vibration based speed-recognition for measuring the rotational speed ω of one or more drone propellers is displayed in FIG. 2.

Figure 2:
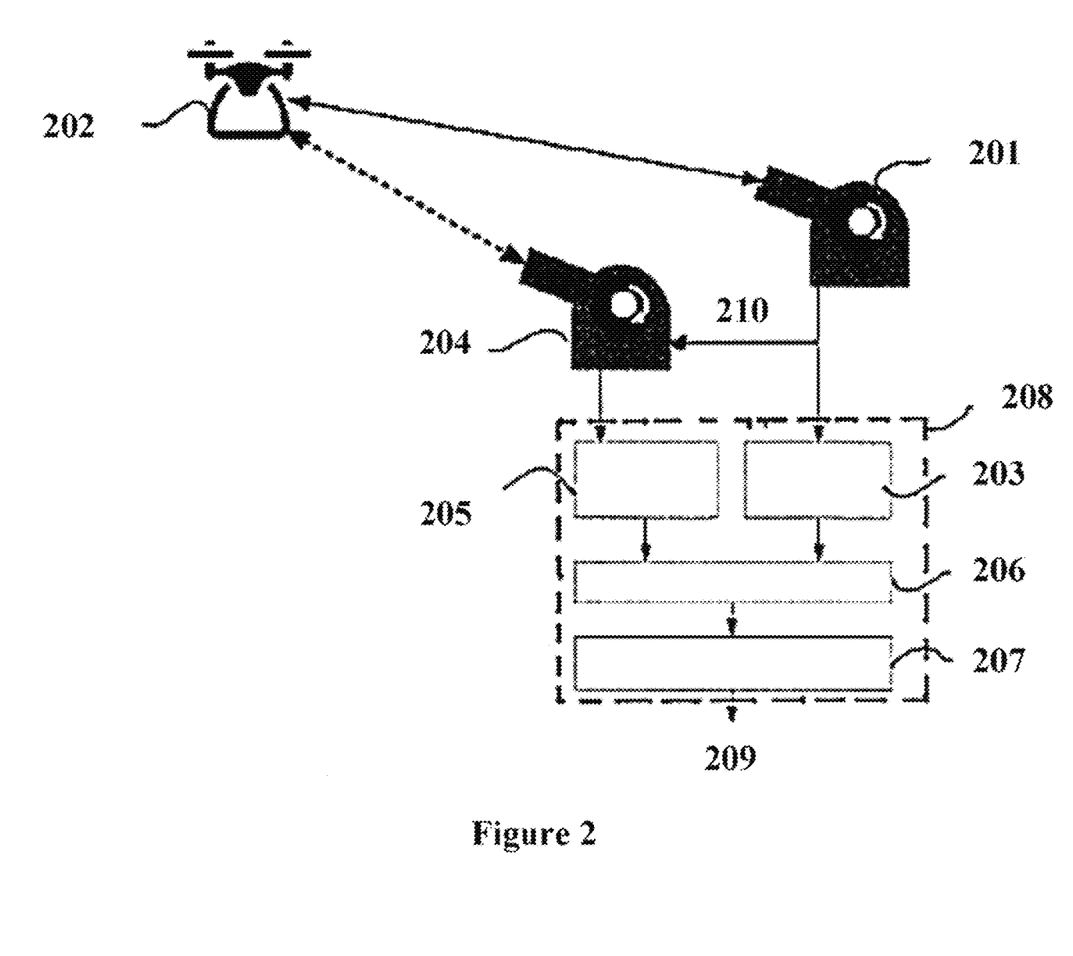
FIG. 2 is a schematic flow diagram of a method to estimate a vehicle's mass and health using laser Doppler vibrometer in accordance with the present teachings.

An external drone detection and positioning system 201, such as RF radar, laser radar, or an optical positioning, is used to estimate an instantaneous position vector P and to transmit the position vector to a digital signal unit 203. The unit 203 stores successive measurements of position vector of a pre-determined duration in an internal digital memory. A digital signal processing step in 203 involves a calculation step for the corresponding speed and acceleration vectors $\dot{X}$, $\ddot{X}$ respectively from the stored measurements using, for example, Kalman filters, state observers, and/or numerical differentiators.

A laser Doppler vibrometer (LDV) device 204 is used to remotely measure vibration of a target drone 202. The drone detection positioning system 201 sends the instantaneous position of the drone 202, via connection 210, to a motorized 3D rotatable mechanism attached to the LDV device 204 in order to direct laser beam of the LDV 204 to the drone 202. A digital signal processing step in 205, via a processor, involves an extraction for the rotating speed of one or more propellers of the drone 202 form the LDV signal.

A step of digital signal processing 206, via a processor, is used to solve the EOM such as Eqs. (1-3) to estimate unknown EOM parameters 207, e.g., K and α including the vehicle mass 209, m, using the instantaneous rotating speed from 205 and the instantaneous position, speed and acceleration from 203. The least squares or Bayesian techniques may be used in said digital processing in 206 to solve EOM. The processing steps in 208 may be executed in a digital signal processing board or in a computer program.

Figure 3:
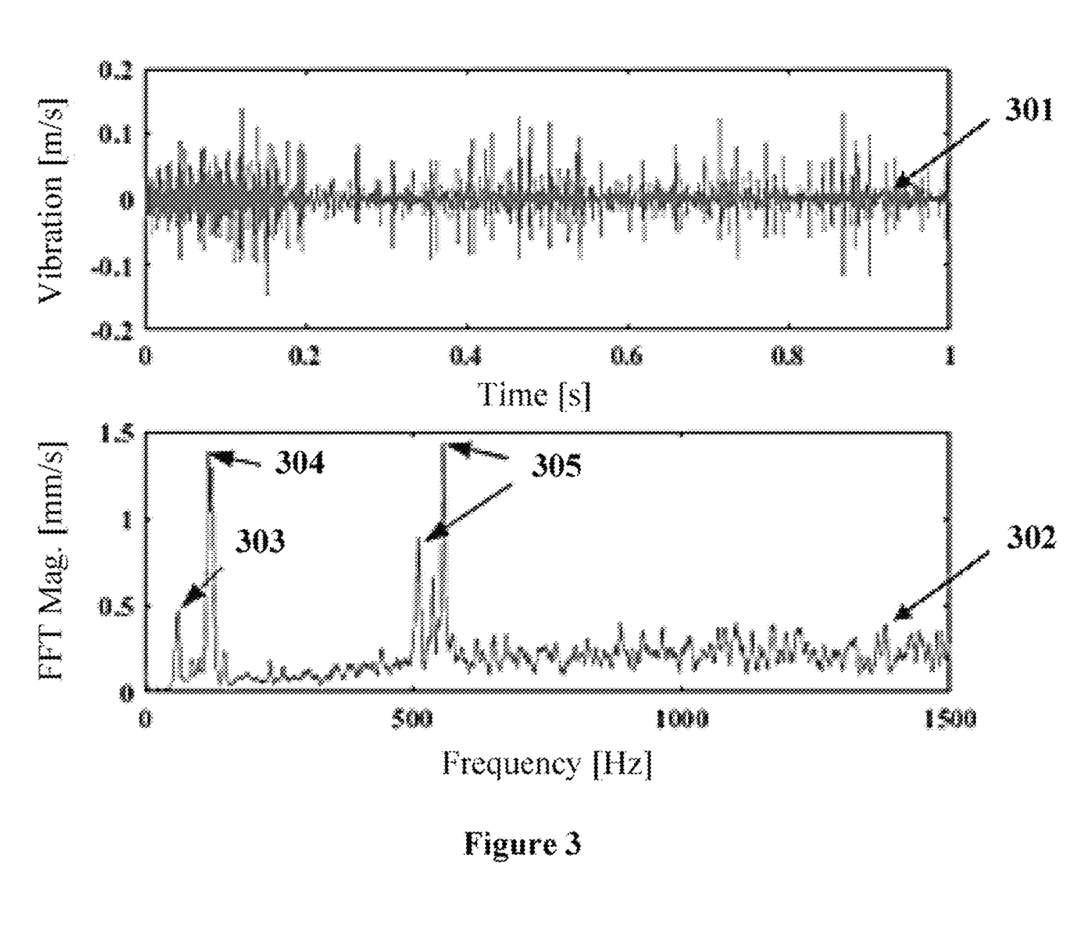
FIG. 3 illustrates a time waveform diagram and frequency spectrum diagram of a vibration signal from a laser Doppler vibrometer directed to a vehicle in accordance with the present teachings.

The signal processing of the vibration data in 205 is explained in FIG. 3. The upper diagram 301 shows exemplary time waveform data obtained by recording a signal from a laser Doppler vibrometer device over time, while the laser Doppler vibrometer captures the transient vibration of a quadcopter during hovering in a fixed position. The time waveform data is then transformed to a frequency spectrum in order to extract motor shaft rotating speed peak 303 at 61 Hz and confirmed by the related blade passing frequency peak 304 at 122 Hz, which is two times the motor shaft rotating speed because the propeller has two blades. The frequency spectrum obtained from the time waveform data displayed in diagram 301 is displayed in diagram 302. In this diagram 302, the Fast Fourier Transform (FFT) spectrum is displayed in a way that the low frequency band recognizes propeller rotating speeds (303, 304) and their harmonics, while the higher frequencies 305 indicate unique identification signatures that represent the mechanical structure of the drone. These signatures can be stored in a database to recognize a specific drone model by matching the FFT spectrum of an unknown drone to a pre-stored FFT spectrum of known models of drones.

The LDV remotely measures vibrations of a remote drone using Doppler shift of the reflected laser beam frequency due to the motion (e.g., body vibration) of a target surface of the drone. The LDV can be used to measure mechanical vibration of a drone, or any aerial vehicles, without contact by directing the LDV laser beam to a point on the drone external surface. The vibration of the drone body involves a vibration noise from the drone motors, which can be processed, for example by in FIG. 3, in order to extract instantaneous rotating speed of drone motors.

The vibration collected by the LDV has several benefits. The LDV can measure vibration with broad band frequencies (e.g., about 20 kHz or greater), which may be better than normal acoustic sensors due, at least in part, to laser beam sensitivity. Frequency spectrum and time statistics of LDV vibration measurements can provide unique signatures of drones. A database of vibration signatures of commercial drones and aircrafts in general from different manufacturers can be collected to identify flight characteristics and drone manufacturers.

The vibration signature measured by LVD can be further used for monitoring overall health or maintenance status and degradation of drones against any fault or failure conditions because the FFT spectrum in FIG. 3 is also influenced by the degradation or healthy level of the drone. A database of FFT spectrums from LDV of the drone at different degradation levels can be used to match the unknown degradation level of a drone from the same or similar model.

Figure 4:
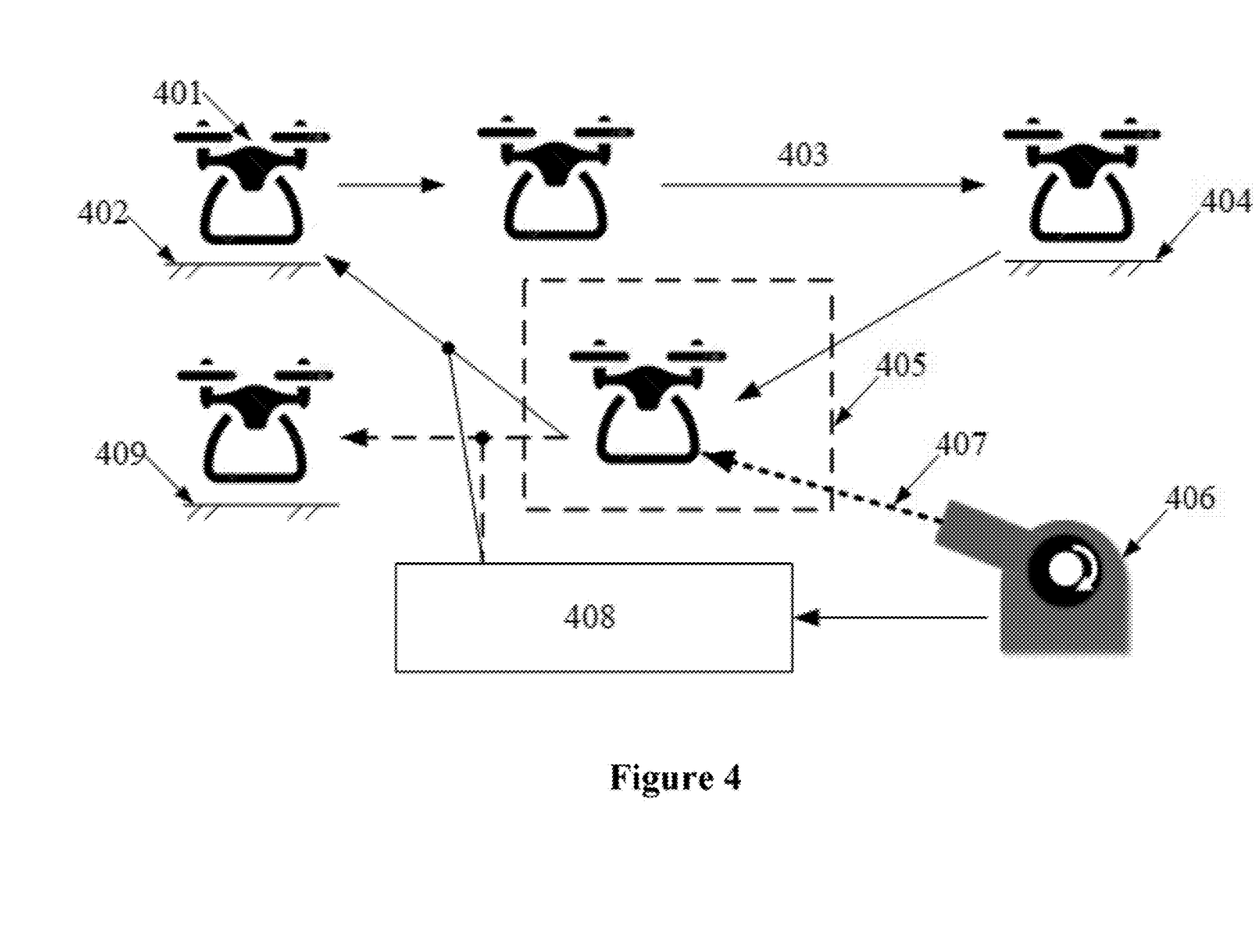
FIG. 4 is a schematic drawing of a condition based maintenance system to determine the maintenance status of a vehicle in accordance with the present teachings.

An example of a condition based maintenance system is shown in FIG. 4. A drone or other aerial vehicle 401 is placed on a hangar 402, serving as starting point for missions. When a mission request is received (e.g., for transportation, rescue, or video surveillance), the drone 401 flies from the hangar 402 along a mission path 403 to another location 404, representing the mission's destination. After the mission has been completed, the drone 401 flies back through a health monitoring zone 405, which includes a fixed or movable LDV 406, to check a vibration signature of a flying drone 401 by scanning its surface/body by one or more laser beams 407 of the LDV 406. The LDV 406 generates a vibration signature, such as an FFT spectrum of the LDV. The vibration signature is analyzed by a set of algorithms 408, such as a comparison with a stored database conditions, in order to decide whether the drone 401 has an acceptable condition to fly to a hangar location 402, or whether the drone 401 requires flying to a maintenance location 409.

Vibration signatures referred to above may include, but are not limited to: root-mean-square energy of whole vibration signal, root-mean-square energy of a set of band pass filtered segments of whole vibration signal, frequency spectrum, vibration band width, cyclostationary correlation, spectral kurtosis, and angular resampling technique.

An installation method for a laser Doppler vibrometer is shown in FIG. 5, where vibration of an aerial vehicle (505, 510) is measured by directing laser beams (503, 504, 508, 509) from a laser Doppler vibrometer (501, 506) attached to another aerial vehicle (502, 507). Such laser Doppler vibrometer (501, 506) measurements can be utilized in aforementioned methods for remote mass estimations and/or health monitoring of aerial vehicles.

Measuring rotational speed of rotating parts of a vehicle may be achieved by using a camera based speed-recognition system. The remote identifying of a drone weight and its health performance using a simplified EOM, such as Eqs. (1-3), can be further implemented by a camera based speed-recognition system for measuring the rotational speed m of one or more drone propellers, as is displayed in FIG. 6.

Figure 6:
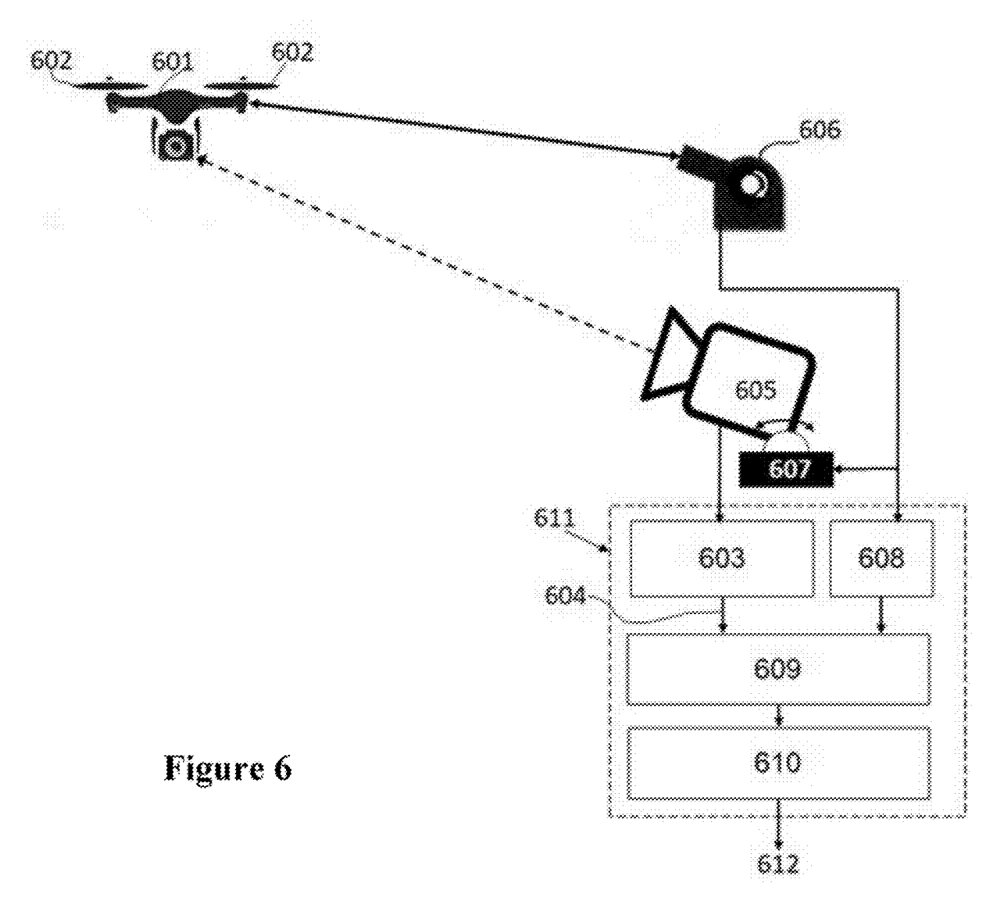
FIG. 6 is a schematic drawing of a method to determine the mass and health of an aerial vehicle by a camera based recognition method in accordance with the present teachings.

The measuring rotational speeds using a camera based speed-recognition system may include receiving successive images with time stamps from a camera 605 directed to a drone 601 having one or more propellers 602; storing a pre-determined duration of the successive images in a digital memory in a digital signal processing and memory unit 603; recognizing, via the digital signal processing and memory unit 603, the rotation angles of at least one propeller 602 of the drone 601 on the successive images by an optical flow or a background subtraction image processing techniques; processing, via in the digital signal processing and memory unit 603, the time variation of the rotation angles into the instantaneous rotating speed of at least one propeller using for example a numerical differentiator. FIG. 6 involves also similar processing steps comparing to FIG. 2 using a camera 605 instead of a LDV 204.

An external drone detection and positioning system 606, such as RF radar, laser radar, or an optical positioning, is used to estimate instantaneous position vector P and to transmit the position vector to a digital signal processor 608. The processor 608 stores successive measurements of position vector of a pre-determined duration in an internal digital memory. The processor 608 calculates the corresponding speed and acceleration vectors $\dot{X}$, $\ddot{X}$ respectively from the stored measurements using digital Kalman filters, state observers, and/or numerical differentiators.

The drone detection positioning system 606 sends the instantaneous position of the drone 601 to a motorized 3D rotatable mechanism 607 attached to the camera 605 in order to direct the camera 605 to the drone 601.

A digital processing step 609, via the processor, is used to solve the EOM such as Eqs. (1-3) to estimate the unknown EOM parameters 610, e.g., K and $\alpha$ including the vehicle mass 612, m, using the instantaneous rotating speed from the digital signal processing and memory unit 603 and the instantaneous position, speed, and acceleration from a digital signal processor 608. The least squares or Bayesian techniques may be used in said digital processing in 609 to solve EOM. The processing steps in 611 may be executed in a digital signal processing board or in a computer program.

Measuring rotational speed of rotating parts of the vehicle in FIG. 6 is achieved by using an external remote optical tachometer directed to the drone. The tachometer signal may be directly connected to the processing step 609 to transmit the rotating speed of one or more propellers in addition to same processing steps in 609, 610, to estimate drone mass 612.

Remote identifying aerial vehicles may involve estimating EOM parameters, e.g., in Eqs. (1-3), in addition to the propeller characteristics. The propeller characteristics may include one or more of the number of propellers for the vehicle, the number of blades for each propeller, the propeller's diameter, the propeller's material, the propeller's pitch, the propeller's design factor, the vehicle shape, the vehicle size, the surface area of the control surfaces, and propeller's efficiency.

Propeller characteristics may be represented by an unknown speed-thrust term, K, such as in Eq. (2). This term may be estimated by solving the EOM of Eqs. (1-3). A formulation of the speed-thrust relation in terms of the aforementioned propeller characteristics may, for example, be re-formulated from Eq. (2) to Eq. (4), assuming a multi-rotor drone as follows:

$$T = K\omega^2 = [nk_2(D^{10}p_i^2\Sigma)^{1/3}]\omega^2 \quad (4)$$

where $k_2$ is the design efficiency factors for the propeller, which depends on physical units of other parameters, n is the number of propellers for the drone, D is the propeller's diameter, $p_i$ is the propeller's pitch, and $\rho$ is the air density. The parameter $k_2$ may be taken as an average value for a wide range of drones or kzcan be determined based on a lookup table as a function of other parameters, e.g., $\omega$, D and/or $p_i$. The instantaneous rotational speed, $\omega$, can be remotely measured by one of aforementioned methods, such as camera based, vibration based, or from an optical tachometer.

The propeller characteristics, e.g., D, $p_i$, n, may be remotely monitored by the same camera recognition method in FIG. 6. The camera recognition method, in FIG. 6, involves a camera 605 and a digital processor and memory unit 603 which receives successive images from the camera 605. The camera 605 is directed to the drone 601. In addition to the aforementioned processing tasks of unit 603 for extracting propeller speeds, the digital processor unit 603 may have additional processing tasks by detecting one or more pattern features of the images received from the camera 605. This pattern detection may be implemented by an optical flow or a background subtraction image processing technique. The digital processor unit 603 further recognizes the similarity of the pattern features to a pre-stored database of propeller characteristics using neural networks to select a matched case for one or more propeller characteristics.

The extracted propeller characteristics from the previous step are then transmitted to the digital processing unit in 609 to solve an extended version of EOM, e.g. Eqs. (1-2, 4), to estimate the unknown EOM parameters 610, e.g., K and $\alpha$ including the vehicle mass 612, m.

Remote recognizing propeller characteristics, e.g., D, $p_i$, n in Eq. (4), may be based on a vibration based recognition method for propeller characteristics, which can be implemented using same processing architecture in FIG. 2. The vibration based recognition method may include receiving a vibration sample from a laser Doppler vibrometer 204 directed to the vehicle 202; recording, via the digital signal processing and memory unit 205, a pre-determined duration of the vibration sample in a digital memory in 205; processing, via the digital signal processing 205, the vibration sample into a frequency spectrum; and recognizing, via the digital signal processing 205, the similarity of the frequency spectrum to a pre-stored database of frequency spectrums of known propeller characteristics using neural networks to select a matched case for one or more propeller characteristics.

The extracted propeller characteristics from the previous step are then transmitted to the digital processing unit in 206 to solve an extended version of EOM, e.g., Eqs. (1-2, 4), to estimate the unknown EOM parameters 207, e.g., K and $\alpha$ including the vehicle mass 209, m.

What is claimed is:

1. A method for remote identifying an aerial vehicle, the method comprising the steps of:

receiving a signal of an instantaneous location of the vehicle, with respect to a reference point in three spatial coordinates x, y, z, from a radio frequency radar system, a laser radar system, or a camera based surveillance system;

receiving a signal of an instantaneous rotating speed of one or more propellers of the vehicle from an optical tachometer device directed to the vehicle, a vibration based speed-recognition system, or a camera based speed-recognition system;

receiving a signal that includes one or more propeller characteristics of the vehicle from a camera based recognition system or from a vibration based recognition system;

wherein the one or more propeller characteristics include one or more of a number of propellers for the vehicle, a number of blades for each propeller, a propeller's diameter, a propeller's material, a propeller's pitch, a propellers shape, a propeller's design factor, the vehicle's size, the vehicle's type, a surface area of control surfaces of the vehicle, and a propeller's efficiency;

recording, via a processor, successive samples of a pre-determined duration of the instantaneous location and the instantaneous rotating speed and at least one of the one or more propeller characteristics in a digital memory;

solving, via the processor, a dynamic equation of motion model of the vehicle using the recorded successive samples of the following measurements: the instantaneous location of the vehicle, the instantaneous rotating speed of propellers of the vehicle, and at least one of the one or more propeller characteristics of the vehicle;

wherein the dynamic equation of motion model is solved, via the processor, by a least squares or Bayesian method in order to estimate dynamic model parameters;

wherein the dynamic model parameters include a vehicle mass and a speed-thrust characteristic curve of at least one propeller;

matching, via the processor, the vehicle mass and the speed-thrust characteristic curve of at least one propeller to a pre-stored database of different vehicle manufacturers models to identify a vehicle model; and matching, via the processor, the vehicle model and the speed-thrust characteristic curve of at least one propeller, to a pre-stored database of deteriorated levels of the vehicle to identify a degradation level of the vehicle.

2. The method of claim 1 further comprising:
receiving one or more environmental parameters near the vehicle from a weather monitoring system;
wherein the environmental parameters include wind speed, wind direction, air temperature, air pressure, air humidity, and air quality factor; and
solving, via the processor, an extended version of the dynamic equation of motion model using the recorded successive samples of the instantaneous location of the vehicle, the instantaneous rotating speed of at least one propeller of the vehicle, at least one of propeller characteristics of the vehicle, and one or more of the environmental parameters in order to estimate the dynamic model parameters.

3. The method of claim 1, wherein the step of receiving the signal that includes the instantaneous rotating speed of one or more propellers is from the vibration based speed-recognition system and comprises:
receiving a vibration sample from a laser Doppler vibrometer directed to the vehicle;
recording, via the processor, a pre-determined duration of the vibration sample in a digital memory;
processing, via the processor, the vibration sample into a frequency spectrum; and
recognizing, via the processor, one or more blade pass frequencies on the frequency spectrum by locating speed-dependent frequencies of the vehicle on different frequency spectrums;
wherein blade pass frequencies represent the instantaneous rotating speed of one or more propellers of the vehicle.

4. The method of claim 1, wherein the step of receiving the signal of the instantaneous rotating speed of the one or more propellers is from the camera based speed-recognition system and comprises:
receiving successive images with time stamps from a camera directed to the vehicle;
storing a pre-determined duration of the successive images in a digital memory;
recognizing, via the processor, rotation angles of at least one propeller of the vehicle on the successive images by an optical flow or a background subtraction image processing technique; and
processing, via the processor, a time variation of the rotation angles into the instantaneous rotating speed of at least one propeller using a numerical differentiator.

5. The method of claim 1, wherein the step of receiving the signal that includes one or more propeller characteristics is from the camera based recognition system of propeller characteristics and comprises:
receiving images from a camera directed to the vehicle;
storing a pre-determined number of images in a digital memory;
detecting, via the processor, one or more pattern features of the images by an optical flow or a background subtraction image processing technique; and
recognizing, via the processor, similarity of the one or more pattern features to a pre-stored database of propeller characteristics using neural networks to select a matched case for one or more of propeller characteristics.

6. The method of claim 1, wherein the step of receiving the signal that includes one or more propeller characteristics is from the vibration based recognition system of propeller characteristics and comprises:
receiving a vibration sample from a laser Doppler vibrometer directed to the vehicle;
recording, via the processor, a pre-determined duration of the vibration sample in a digital memory;
processing, via the processor, the vibration sample into a frequency spectrum; and
recognizing, via the processor, similarity of the frequency spectrum to a pre-stored database of frequency spectrums of known propeller characteristics using neural networks to select a matched case for one or more propeller characteristics.

* * * * *